March 26, 1940.　　J. E. KING ET AL　　2,194,797
VERTICAL REFLECTING PROJECTOR
Filed March 31, 1938　　4 Sheets-Sheet 1

JASPER E. KING
VERNON R. POWELL
INVENTORS

BY
ATTORNEYS

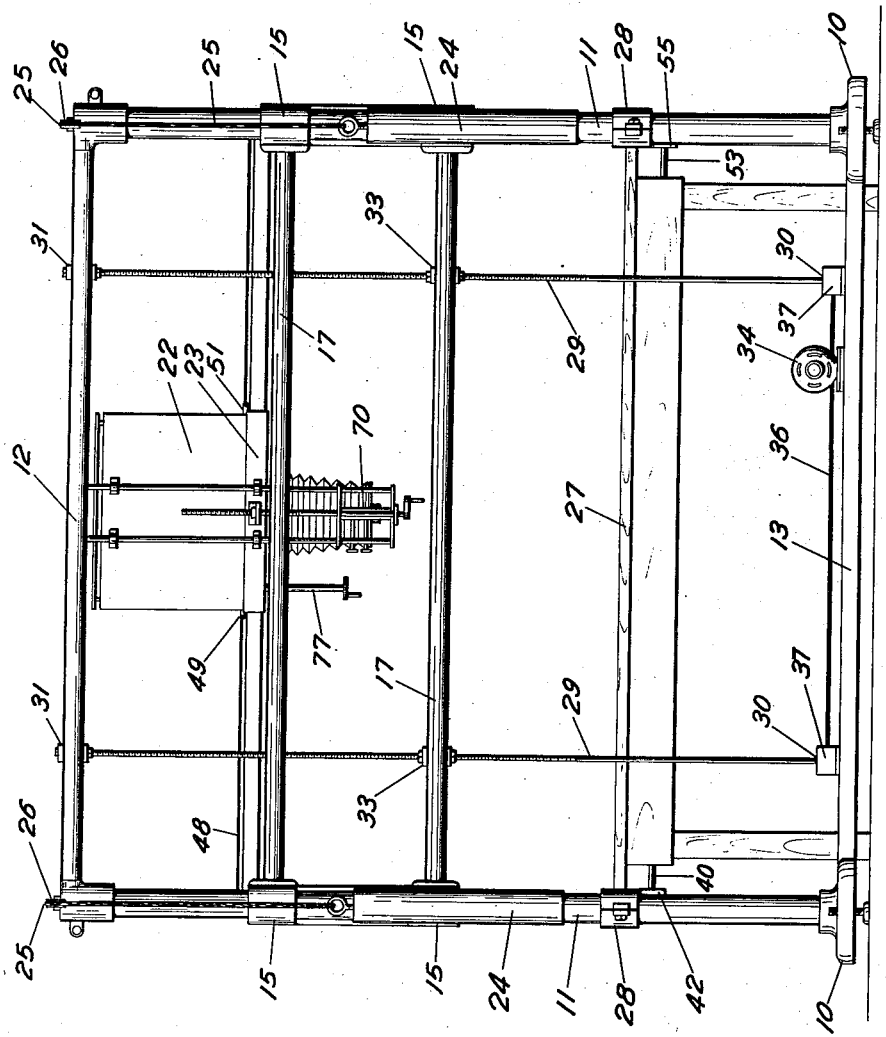

March 26, 1940.　　J. E. KING ET AL　　2,194,797
VERTICAL REFLECTING PROJECTOR
Filed March 31, 1938　　4 Sheets-Sheet 3
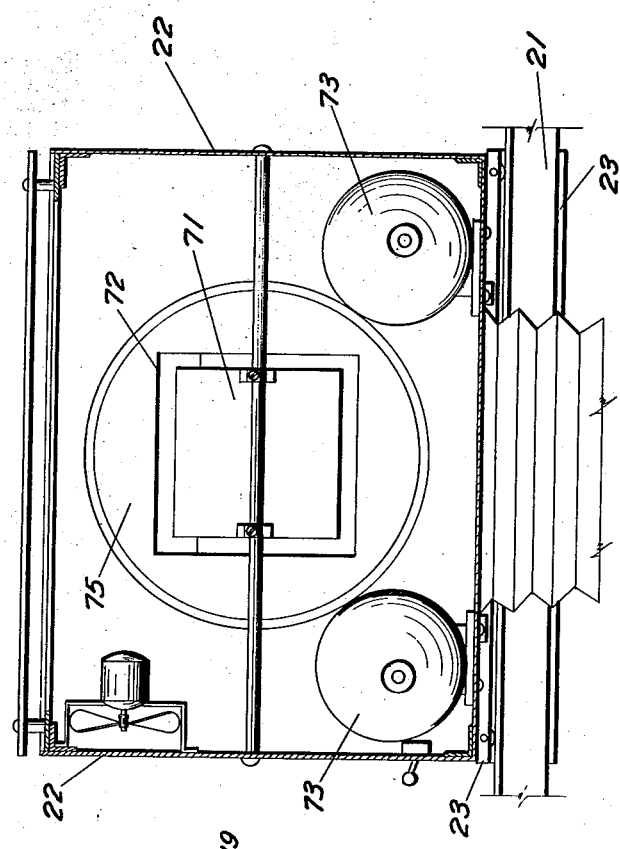
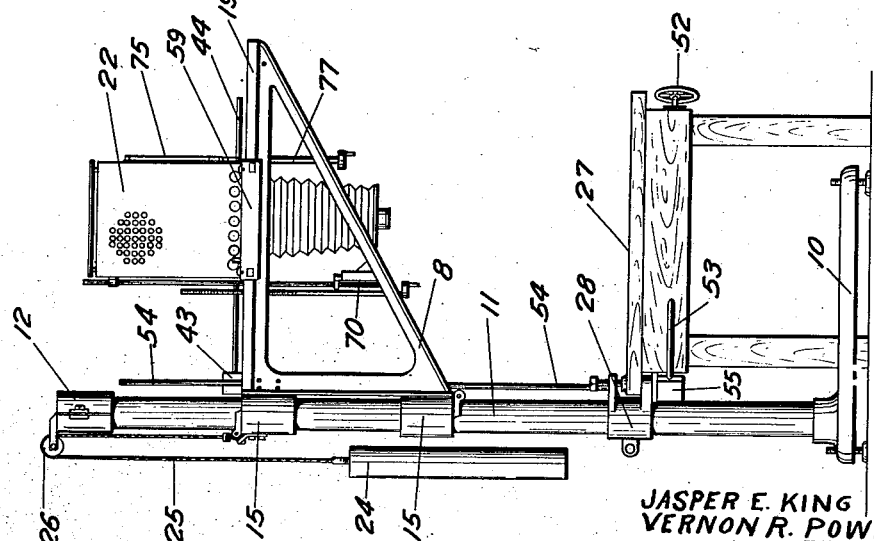
JASPER E. KING
VERNON R. POWELL
INVENTORS
BY
ATTORNEYS

JASPER E. KING
VERNON R. POWELL
INVENTORS

BY ATTORNEYS

Patented Mar. 26, 1940

2,194,797

UNITED STATES PATENT OFFICE 2,194,797

VERTICAL REFLECTING PROJECTOR

Jasper E. King and Vernon R. Powell, Denver, Colo., dedicated to the free use of the People of the United States of America Application March 31, 1938, Serial No. 199,124

2 Claims. (Cl. 88—24)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

We hereby dedicate the invention herein described to the free use of the People of the United States of America to take effect on the granting of a patent to us.

This invention relates to a reflecting projector of the vertical types and is more particularly concerned with means for mechanically supporting and moving the projector with reference to a transfer table or board.

One of the objects of this invention is to provide a machine that will permit the operator to regulate mechanically and control from his working position at the transfer table the movements of the projector in three coordinate directions.

The following description considered together with the accompanying drawings will fully disclose this invention, its construction and operation of parts, and other objects and advantages thereof will be apparent.

In the drawings:

Figure 2 is a rear elevational view;

Figure 3 is a side elevational view; and

Figure 5 is an interior view of the camera box of the projector, as seen from its rear wall.

Figure 1:
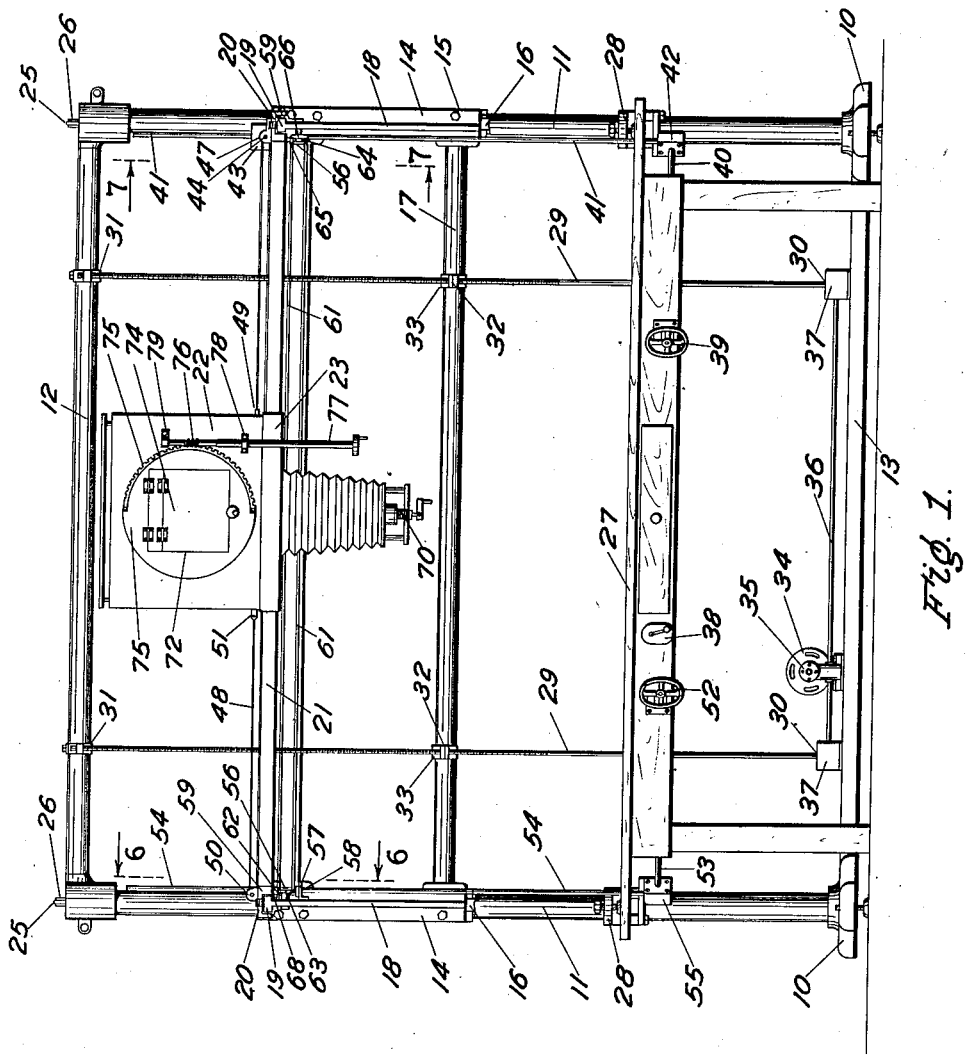
Figure 1 is a front elevational view.
Figure 4:
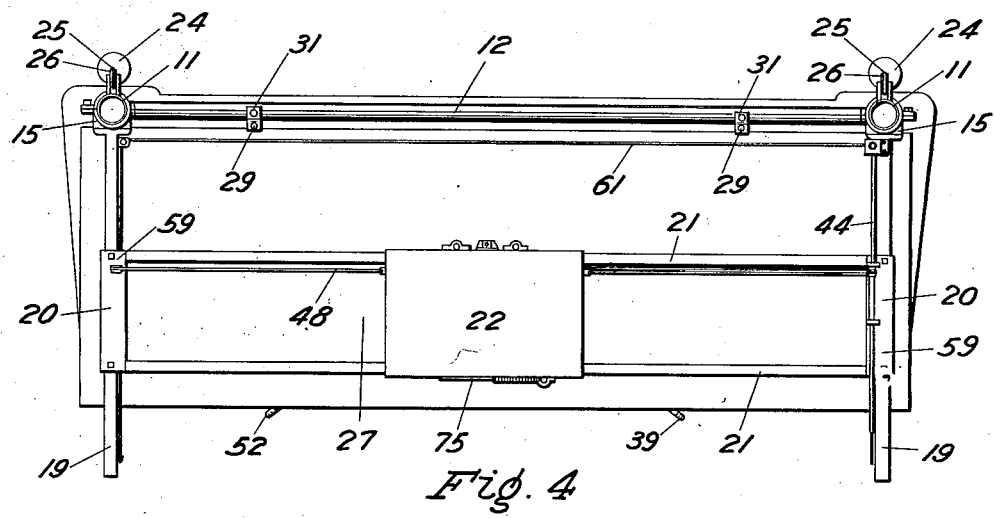
Figure 4 is a plan view of an illustrative form of this invention in its assembled form.
Figure 6:
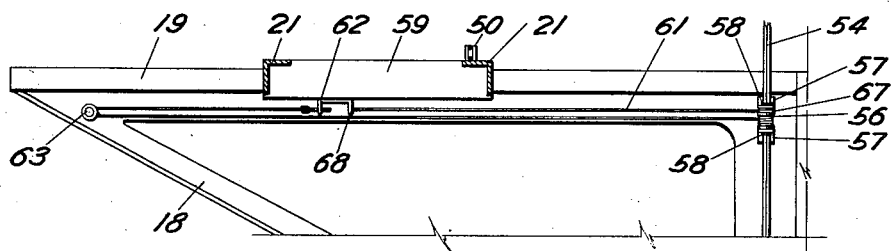
Figure 6 is a sectional view taken along the line 6—6.
Figure 7:
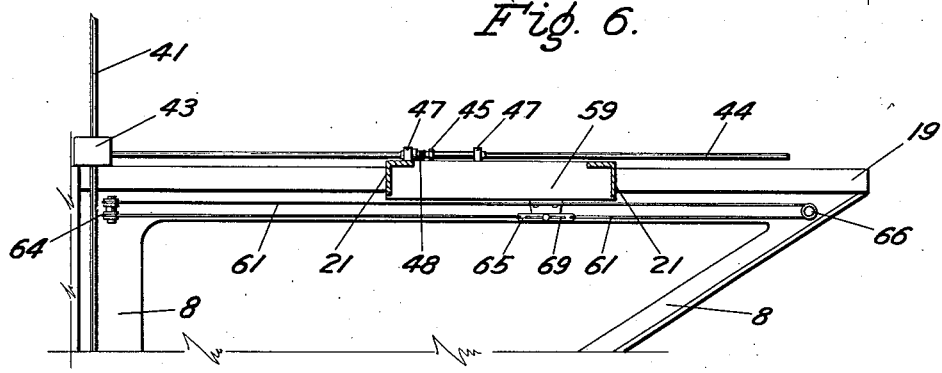
Figure 7 is a sectional view taken along the line 7—7.

Referring with more particularity to the drawings in which like numerals designate like parts, the machine is mounted on a stationary frame which consists of foot bases 10, 10 and two vertical columns 11, 11 with a horizontal spacing bar 12 at the top and a foot casting 13 at the bottom.

A vertical carriage 14 is slidingly mounted on said columns 11, 11 by means of sleeve brackets 15, 15, 15, 15, there being two of such brackets on each column. Each bracket is provided with concave anti-friction sleeve rollers 16. Spacing bars 17, 17 are employed to keep the sleeve brackets in spaced relation. Two large congruent angle brackets 18, 18 are fixedly mounted to the pair of sleeve brackets on each vertical column extending parallel to each other forwardly and they carry horizontal tracks 19, 19. These tracks are provided for the projector carriage 20 slidingly disposed between and on the tracks 19, 19. Anti-friction rollers are secured to said projector carriage 20 between it and tracks 19, 19. Said projector carriage in turn, carries tracks 21, 21 perpendicular to the tracks 19, 19 upon which the projector box 22 is removably and slidably mounted. Anti-friction rollers (not shown) are secured to the inner side of the casting flanges 23, 23 of the projector box 22 for contact with the tracks 21, 21. The vertical carriage 14 with its appurtenant parts is counterbalanced by weights 24, 24 through flexible cables 25, 25, which cables run over fixed pulleys 26, 26, said pulleys being mounted on the spacing bar 12, substantially as shown. With this construction, the projector has three degrees of freedom corresponding to the three coordinate axes. For convenience in description, the vertical movements will be hereinafter referred to as along the Z-axis, the horizontal movements parallel to the projector tracks 21, 21 as along the X-axis, and horizontal movements parallel to the tracks 19, 19 as along the Y-axis.

Directly beneath the vertical carriage 14, a transfer table (or board) 27 is secured to the vertical columns 11, 11 by means of sliding brackets 28, 28.

The vertical carriage is elevated and lowered by means of the threaded shafts 29, 29, said shafts being rotatably mounted between brackets 30, 30 secured to the base of the instrument and brackets 31, 31 secured to the spacing bar 12. The threaded portions of each of said shafts 29, 29 are geared with internal threaded apertures 32, 32 of the brackets 33, 33, said brackets being mounted on the lower vertical carriage spacing bar 17. The rotation of the shafts 29, 29 in one direction elevates the carriage 14 with its appurtenant parts and rotation of said shafts in the opposite direction lowers said carriage. The rotation of these shafts is accomplished by a reversible motor 34, preferably electric, transmitting its power through a speed reducer 35 along the shaft 36 to gear boxes 37, 37 near the end of the foot casting 13, and thence to shafts 29, 29. Said motor 34, if electric, may be controlled by a reversible switch 38 panelled on the front of the table 27 near the operator's position.

Motion along the X-axis is imparted by means of a wheel 39, fixedly mounted near the operator's position at the table 27 on a rotatably mounted shaft 40. Motion from this wheel is imparted through the shaft 40 to a vertical hexagon shaft 41 by means of the gear box 42. Another gear box 43, having a slidable bevel gear on the shaft 41, transmits motion of the shaft 41 to the horizontal hexagon shaft 44. Said shaft 44 passes through a drum 45, fitted with a hexagon hole, which drum is held in place on the casting 46 by means of two journals 47, 47. Around said drum 45 several turns of wire 48 are wound, preferably No. 6 steel wire, one end of which is attached to the near end of the projector box at 49, while the other end of the wire passes under said projector up and over a sheave 50 and is then attached to the opposite side of the projector at 51.

By this arrangement the wheel 39 controls movements of the projector along the X-axis. It has been found that a desirable ratio of said movement is at the rate of about three inches per turn of the wheel. Motion along the Y-axis is accomplished in much the same manner. A wheel 52, similar to the wheel 39, is mounted on the front of the table 27 near the operator's position. From this wheel, motion is imparted to a shaft 53, which motion is, in turn, transmitted to a vertical hexagon shaft 54 by means of a bevel gear box 55. The said shaft 54 then passes through a drum 56 which drum is held in place by the bracket 57 with two journals 58, 58. Motion of this shaft 54 is transmitted to the roller castings 59, 59 at the end of the carriage 20 at 60 by means of a length of wire 61, preferably No. 9 steel wire. This wire is first attached to one of the castings 59 at the point 62 and then goes forward and over the top of a sheave 63 then returns to the roller drum 56 which is wrapped with several turns of this wire. The wire is then carried across to the other side of the projector around a sheave 64 and is attached to the casting 59 at the point 65. The wire continues from this point to a sheave 66 going under and over said sheave returning to another sheave 67 on the drum 56 and is then fastened to the lower casting 59 at 68. By this means the manual rotation of the wheel 52 effects motion of the projector along the Y-axis. A motion of about three inches along this axis per turn of the wheel 52 is found to be a satisfactory ratio. A slotted strap 69 is interposed in the wire 61 to facilitate alignment of the projector carriage 20.

The projector itself may be of any of the ordinary types in general use with a rack and pinion arrangement 70 to accomplish vertical adjustments for focusing the image.

The camera box houses a square mirror 71, set at an angle of 45° to the plate receiving frame 72. An artificial source of light 73 illuminates the image of the picture which is reflected by the mirror 71 through the lens of the projector upon the top of the table 27. The plate receiving frame 72 is mounted on the inside of the camera box door 74 which door is horizontally mounted on a circular panel 75 rotatably mounted on the front of the camera box. A segment of the periphery of the circular panel 75 is racked and meshes with a worm screw 76 mounted on front of the camera box by means of a rod 77 and brackets 78 and 79. By this arrangement the image can be reflected in any desirable orientation.

Having thus described our invention, we claim:

1. A device of the character described comprising a base, uprights on said base, a frame having horizontal tracks vertically moveable between said uprights, bosses secured to said frame, vertical screws engaged with said bosses, electrically controlled means for rotating said screws simultaneously, a horizontal track assembly slidably disposed on and perpendicular to the tracks of said frame, a sheave secured to one end of said frame, a sleeve nut near the opposite end of said frame, a loop cable attached to said track assembly, said cable being partially wound about said sleeve nut and engaged over said sleeve, a projector slidably mounted on said track assembly, sheaves secured to the ends of said track assembly, a looped cable about said sheaves, said cable being attached to said projector and partially wound about another sleeve nut, vertical rods engaged with said sleeve nuts, and means to controllably rotate said rods.

2. The device defined by claim 1 having cables secured to the vertically moveable frame thereof, pulleys secured at the top of said uprights, said cables passing over said pulleys, and weights attached to the opposite ends of said cables to counterbalance the weight of said frame and members thereon.

JASPER E. KING.
VERNON R. POWELL.